INVENTORS
ABRAHAM BROTHMAN
STEPHEN J. HALPERN
RICHARD D. REISER
ALLEN A. MILLER
STEPHEN F. FINKEY
WILLIAM CHEN
OSTROLENK, FABER, GERB & SOFFEN
ATTORNEYS

April 2, 1968 A. BROTHMAN ET AL 3,376,511
PHASE-SHIFT KEYING RECEIVER UTILIZING THE PHASE SHIFT CARRIER FOR SYNCHRONIZATION
Filed Aug. 9, 1963 5 Sheets-Sheet 2

INVENTORS
ABRAHAM BROTHMAN
STEPHEN J. HALPERN
RICHARD D. REISER
ALLEN H. MILLER
STEPHEN F. FINKEY
WILLIAM CHEN
OSTROLENK, FABER, GERB & SOFFEN - ATTYS.

INVENTORS
ABRAHAM BROTHMAN
STEPHEN J. HALPERN
RICHARD D. REISER
ALLEN H. MILLER
STEPHEN F. FINKEY
WILLIAM CHEN
BY Ostrolenk, Faber, Gerb & Soffen
ATTORNEYS INVENTORS
ABRAHAM BROTHMAN
STEPHEN J. HALPERIN
RICHARD D. REISER
ALLEN H. MILLER
STEPHEN F. FINKEY
WILLIAM CHEN
BY
OSTROLENK, FABER, GERB & SOFFEN - ATTORNEYS United States Patent Office 3,376,511
Patented Apr. 2, 1968

3,376,511
PHASE-SHIFT KEYING RECEIVER UTILIZING THE PHASE SHIFT CARRIER FOR SYNCHRONIZATION

Abraham Brothman, Dumont, N.J., Stephen J. Halpern, New York, N.Y., Richard D. Reiser, Waldwick, N.J., Allen A. Miller, Laurelton, N.Y., Stephen F. Finkey, Passaic, N.J., and William Chen, New York, N.Y., assignors, by mesne assignments, to Sangamo Electric Company, Springfield, Ill., a corporation of Delaware
Filed Aug. 9, 1963, Ser. No. 301,110
6 Claims. (Cl. 325—320)

This invention relates to communications systems and more particularly to novel means for synchronizing the operation of transmitter and receiver locations employing a phase shift concept.

One application of communications systems finding extremely wide-spread use is that of transmitting data from one remote location to another. The justification for such systems is quite evident, due to the existence of a variety of situations, some of which are:

Systems in which the location at which data is being gathered is undesirable as the location for the digital computer means which will operate on such data and due to the large amount of data being gathered and the desirability of operation on this data as quickly as possible, it becomes desirable to transmit data via a suitable communication system adapted to handle such data at high transmission rates.

Systems wherein a plurality of remote locations, each of which is not sufficiently large to demand full time need of a large scale digital computer system that wherein all of said remote locations might be supplied by a central computer location, it is highly desirable to provide an extremely large scale digital computer system which the remote locations may reach by means of communications systems adapted to transmit data from the remote locations to the central locations at high rates of speed.

In data gathering systems, such as, for example, telemetry or supervisory control systems wherein a central location is designed to monitor an extremely large number of remote locations to establish the conditions of equipment at each of these locations, it is desirable to be able to ascertain the conditions of all of these remote locations in as little time as possible by the utilization of communications systems which can handle and transmit data at extremely high rates of speed. In the transmission of messages from one location to another, it is possible to operate successfully in the presence of high percentage rates of error, but with the transmission of numeric data such wide latitudes are extremely harmful and minimum probabilities are usually no greater than $10^{-8}$.

One of the problems encountered in addition to that of noise phenomenon being imposed into the communications link is that of synchronization between the remote transmitter and receiver locations. When operating at such high bit speeds, the failure to provide exact synchronism between receiver and transmitter locations will invoke large errors into the system resulting in receipt of completely invalid data.

Numerous approaches have been taken to provide a solution to this problem, some of which are:

Providing a common source for synchronization of both receiver and transmitter facilities, such as, for example, a 60 cycle source from which both locations are energized.

Transmitting synchronizing data along with the message, which data is utilized at the receiver facility to sync in receiver with transmitter.

The instant invention employs a phase shift transmission mode having a receiver facility which utilizes only the phase shift carrier to synchronize receiver with transmitter, thereby avoiding the need for depending upon a common source from which both locations receive their energy and also further avoiding the need for transmitting special synchronizing pulses to provide the synchronizing operation.

The instant invention is comprised of a phase shift transmitter adapted to transmit a carrier which is in phase when transmitting a first binary state and is out of phase when transmitting a second binary state. The phase modulated carrier is then transmitted to the receiving means which is comprised of means for receiving the phase modulated carrier and comparing the received carrier against a reference frequency signal which is both in phase and 180° out of phase. Each of said comparison means provides an output when the phase modulated carrier is in phase with the local carrier frequency signal, which may be considered as the standard, so that only one of said comparison circuits yields an output at any given instant. The comparison means are then employed to drive a suitable flip-flop circuit whose output provides a substantially square pulse waveform of two distinct binary states representing a mark pulse and a space pulse respectively.

The reference frequency is generatd by driving a ringing circuit by the received phase modulated carrier which first undergoes full wave rectification to generate an output of substantially twice the carrier frequency signal. This signal is then amplified and limited to drive a frequency division circuit designed to drive second ringing circuit means which generate a signal of the original carrier frequency. The output of the second ringing circuit is phase shifted to compensate for any phase delays undergone by the modulated carrier between the receiver input and the phase comparison circuitry. The phase shifting means also generates the two reference frequencies which are 180° out of phase relative to one another. The phase shift is a one-time adjustment and need not be changed throughout the operation of the receiver. This arrangement provides a remarkably accurate arrangement for synchronizing the receiver location with the transmitter location without the necessity for providing synchronizing or timing pulses in the transmitted phase modulated carrier.

It is therefore one object of the instant invention to provide a novel means for synchronizing the operation of a receiver facility with a remote transmitter facility without the necessity for transmitting synchronizing signals with the carrier frequency or of providing synchronization for both transmitter and receiver facility from a single source.

Still another object of the instant invention is to provide novel synchronizing means utilizable in communication systems which is comprised of ringing circuit means for generating an output waveform at twice the frequency of the phase modulated carrier employed in the communication system.

Still another object of the instant invention is to provide novel synchronizing mans for use in synchronizing the transmitter-receiver locations of a communications system comprising novel means for generating an output waveform at twice the frequency of the phase modulated carrier which is then divided to provide pulses at the repetition rate of the carrier frequency.

Still another object of the instant invention is to provide means for synchronizing the operation between a transmitter and a receiver facility comprising a novel arrangement for generating an output at twice the phase modulated carrier frequency, dividing this output waveform to provide pulses at a repetition rate of the carrier frequency and then generating an output waveform which is in exact synchronism with the phase modulated carrier frequency.

Still another object of the instant invention is to provide novel means for synchronizing the operation between remote transmitter and receiver facilities wherein novel means are provided for interlocking the operation of the receiver facility comparison means utilized to determine the phase of the phase modulated carrier at any given instant.

These and other objects of the instant invention will become apparent when reading the accompanying description and drawings in which.

Figure 3:
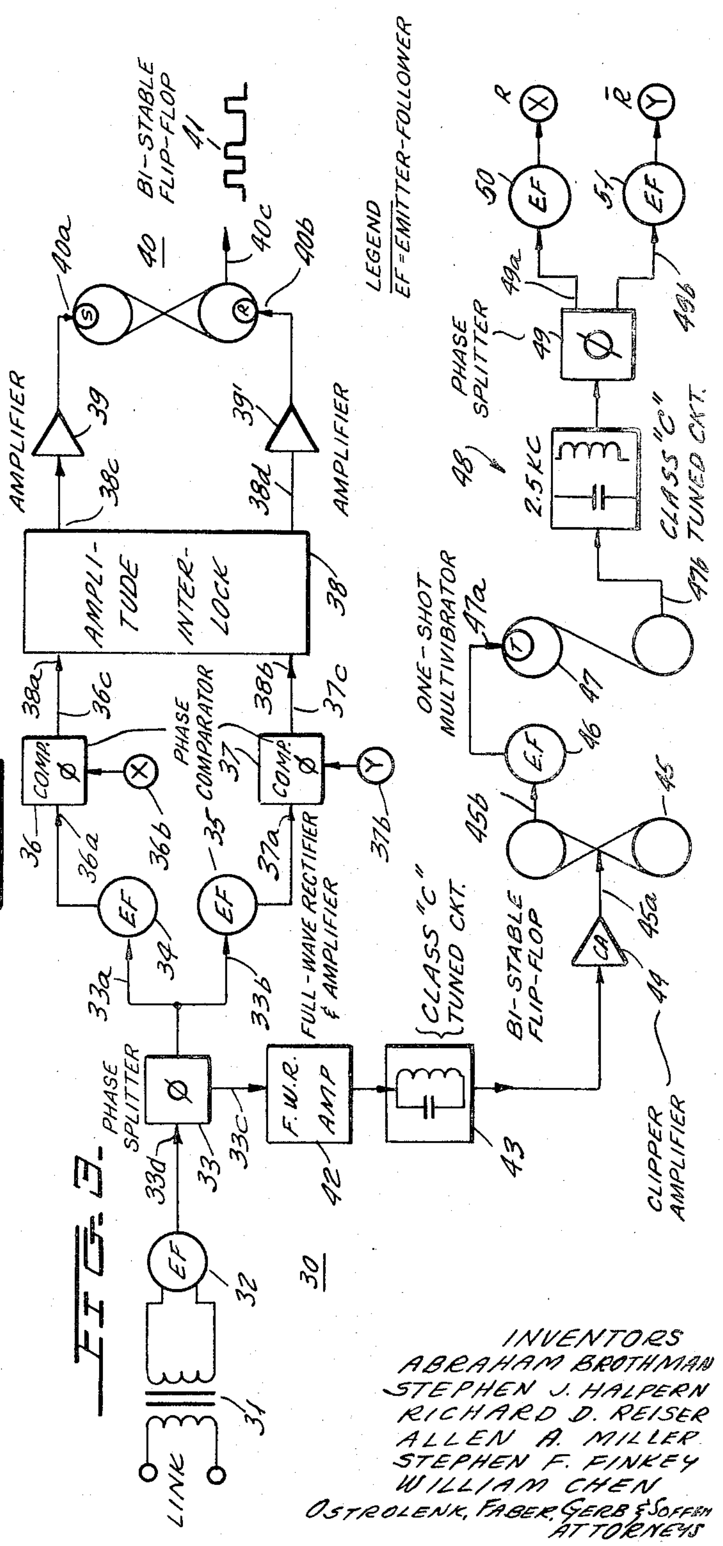
FIGURE 3 is a block diagram of the phase shift receiver means designed in accordance with the principles of the instant invention.
Figure 4A:
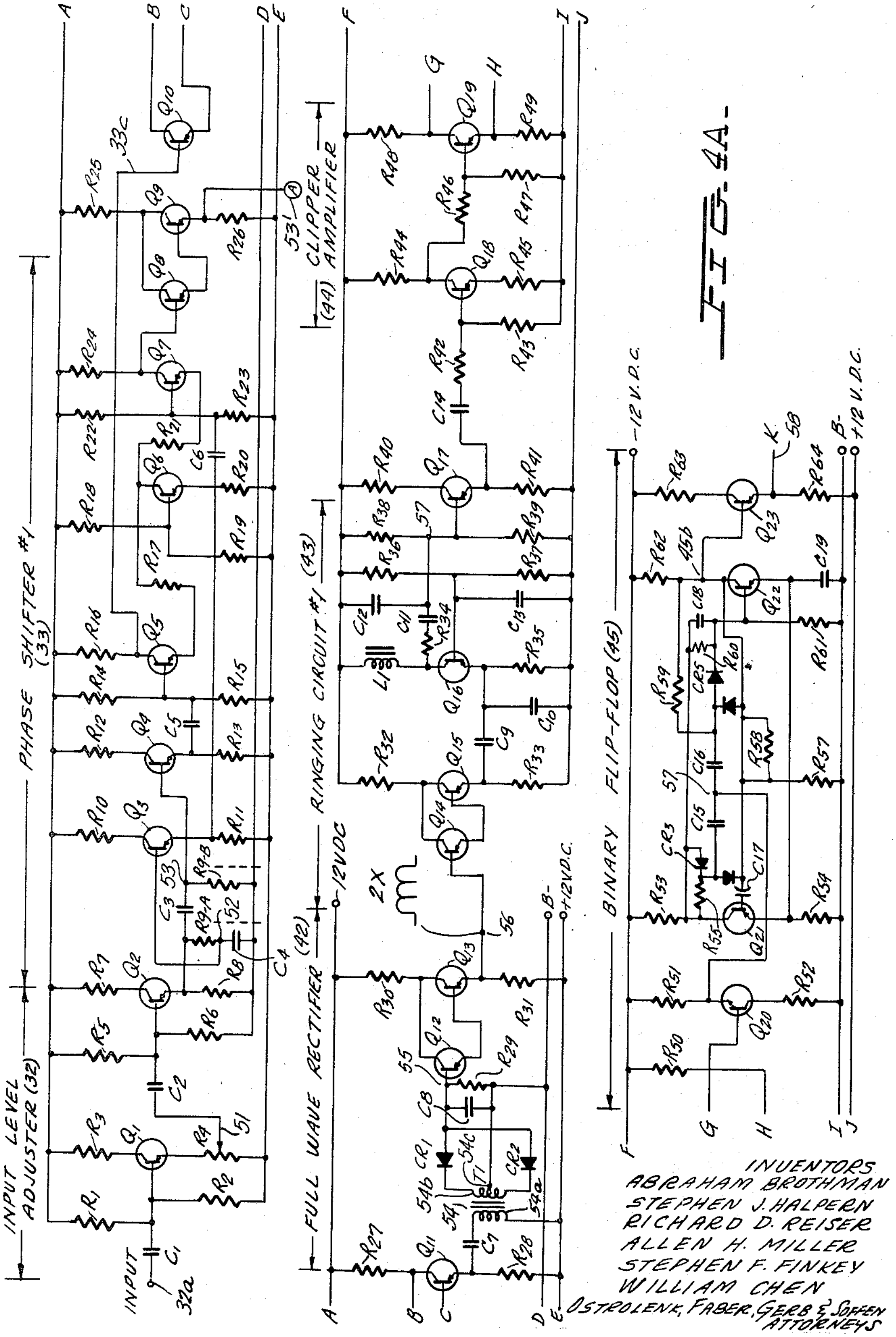
Figure 4B:
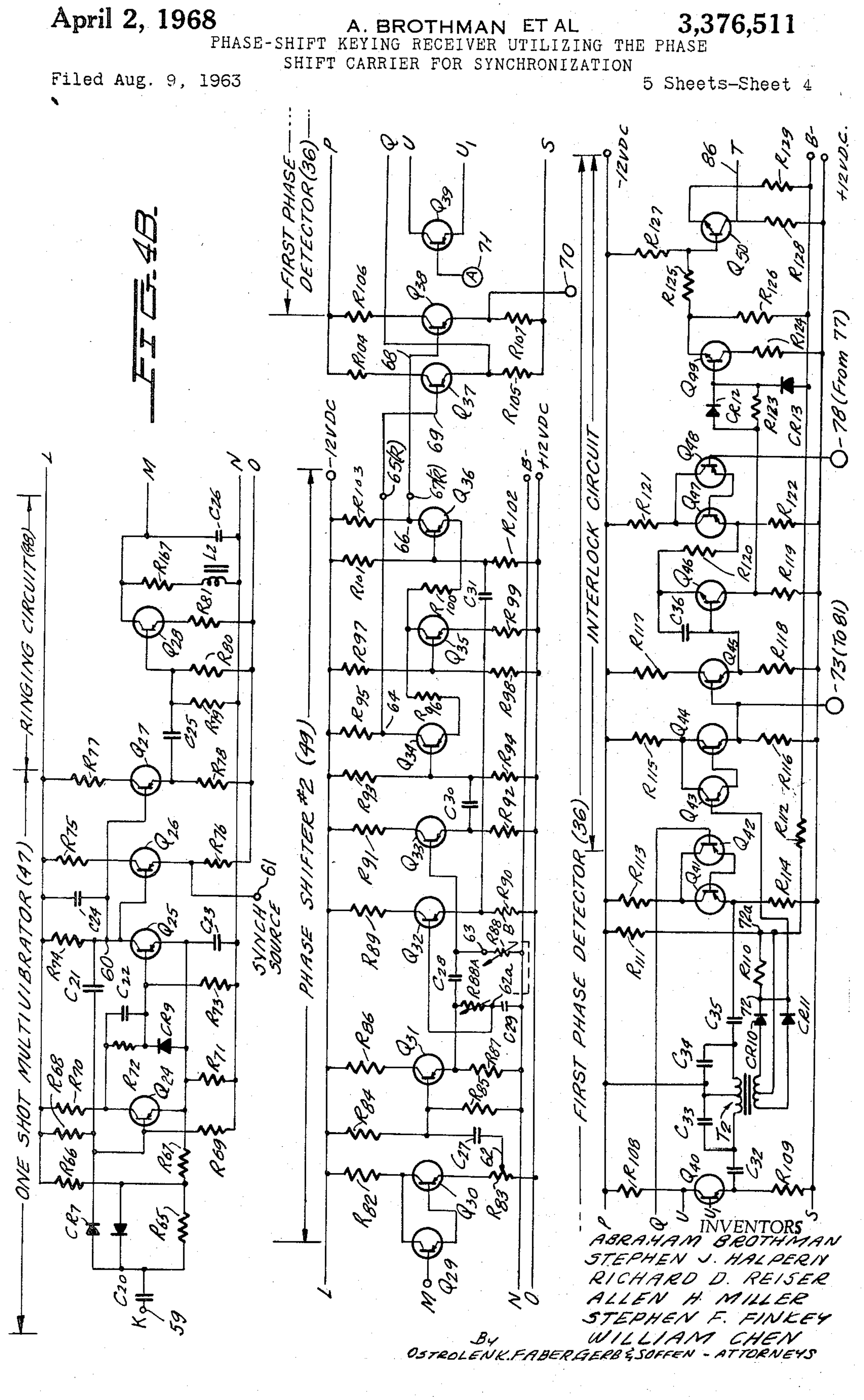
Figure 4C:
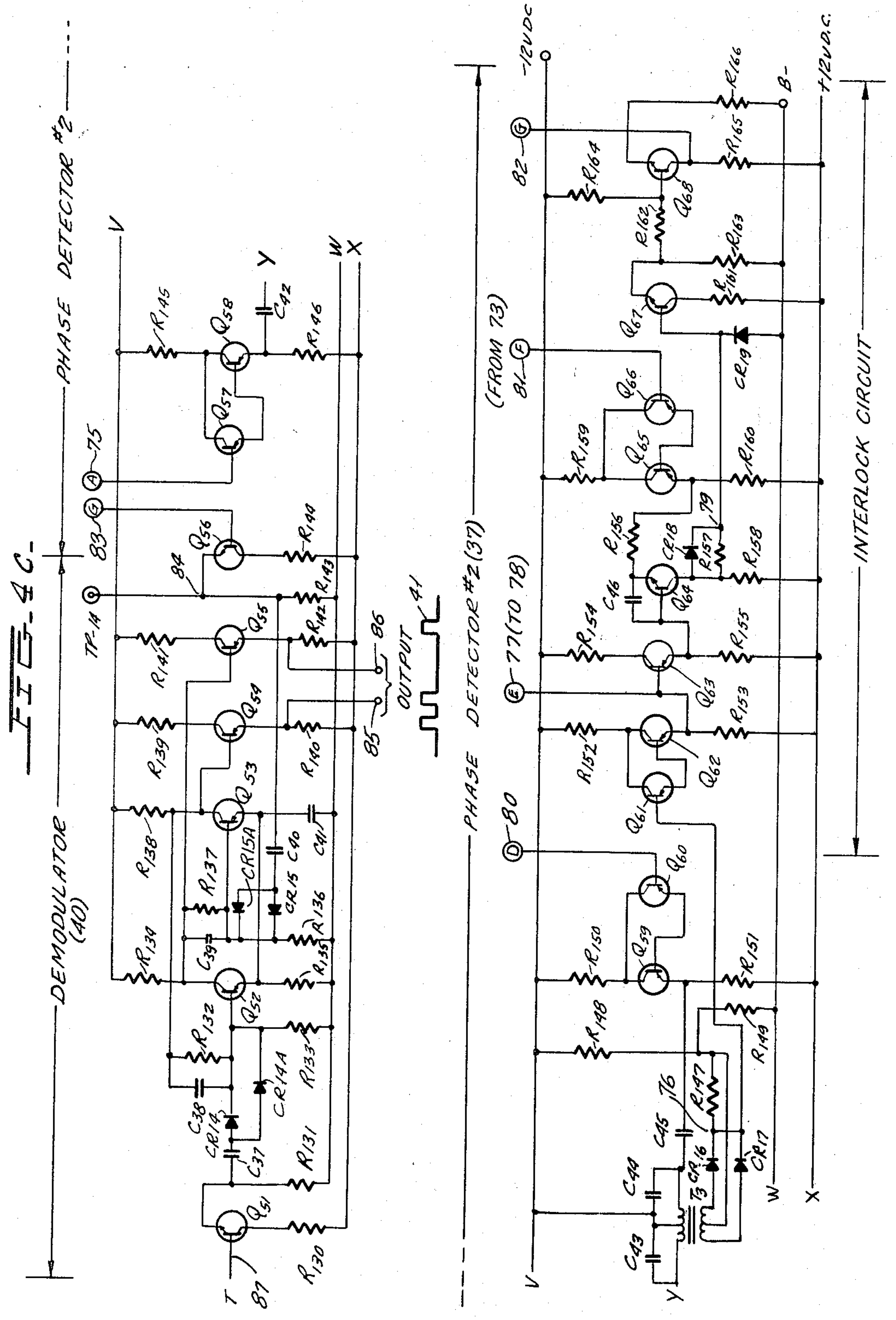

FIGURES 4*a*, 4*b* and 4*c*, when considered together, comprise a schematic diagram of the phase shift receiver of FIGURE 3.

Figure 1:
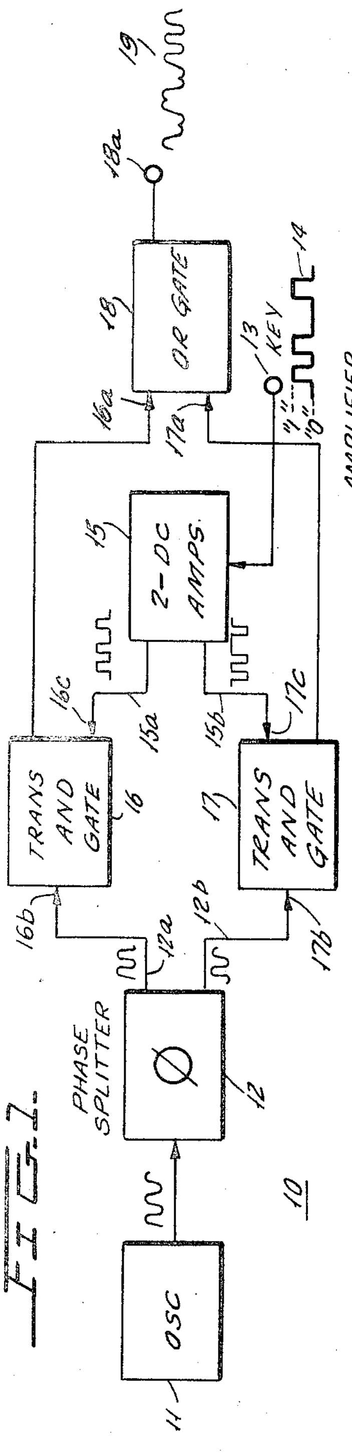
FIGURE 1 is a block diagram showing the phase shift transmission means.

Referring now to the drawings, FIGURE 1 is a block diagram of the phase shift transmitter 10, employed in the system of the instant invention and which is comprised of local oscillator means 11 designed to generate the carrier frequency. The oscillator output is impressed upon a phase shift circuit 12 which provides a first output **12*a* in phase with the output of the oscillator waveform and a second output 12b which is inverted 180° from the output at 12*a* and hence from the output of oscillator 11. The binary data represented by waveform 14 is impressed upon the input terminal 13 and is used to provide a phase modulated carrier in a manner to be more fully described. The input waveform 14 is impressed upon a keying circuit 15 comprised of two D-C amplifiers which is designed to generate at a first output terminal 15*a* thereof the waveform 14 and a second output terminal 15*b* thereof the waveform 14 in an inverted form. The waveform 14 is capable of existing in only two discreet levels identified as binary one and binary zero. The in-phase waveform at output terminal 15*a* is impressed upon a first keying circuit 16 which passes the waveform at output 12*a* to its output terminal 16*a* when the keying waveform is in the binary one state and which blocks the output waveform appearing at terminal 12*a* when the keying waveform is in the binary zero state. The keying circuit 17 operates in substantially the same manner so as to pass the output waveform appearing at terminal 12*b* when the inverted waveform appearing at output terminal 15*b* is in the binary one state and to block the output signal from terminal 12*b* when the inverted waveform is in the binary zero state. The outputs 16*a* and 17*a* of keying circuits 16 and 17 are impressed upon an OR gate 18 which provides a phase modulated output at its terminal 18*a*. As can clearly be seen from the waveforms adjacent the output terminals 15*a* and 15*b*, neither of these waveforms are in the binary zero state or the binary one state at the same instant. One is always at binary zero state when the other is in the binary one state and vice versa. Hence, one of the keying circuits 16 and 17 will always be blocked, while the other is transmitting the carrier waveform impressed upon its input terminal. Thus the output waveform 19** is a phase modulated carrier where the in phase portions represent a binary one state and the out of phase portions represent the binary zero state.

Figure 2:
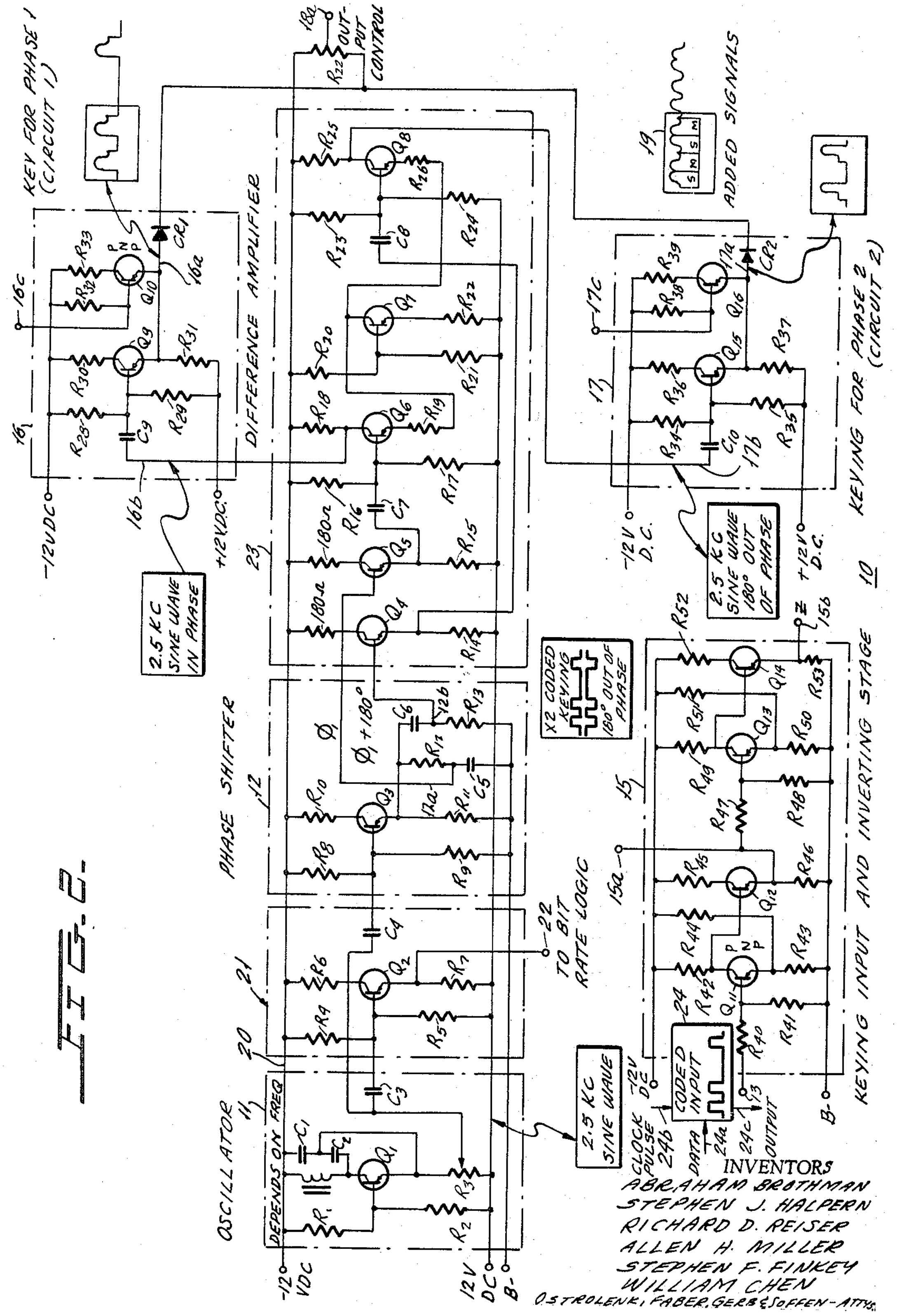
FIGURE 2 is a schematic diagram of the phase shift transmitter of FIGURE 1.

Considering the detailed schematic of the phase shift transmitter of FIGURE 1, which is shown in FIGURE 2 of the drawings, the oscillator circuit is comprised of a transistor Q1 having a tuned circuit comprised of capacitors C1, C2 and inductor L1 connected between the collector electrode of transistor Q1 and the −12 v. DC bus 20. The output of the oscillator stage 11 is impressed upon the base electrode of a transistor Q2 comprising the emitter follower stage 21 which provides an output at the emitter electrode of transistor Q2, which output appears at terminal 22. The output of oscillator 11 is also impressed upon the base electrode of transistor Q3 contained in the phase shift circuit 12, which transistor is connected in emitter follower fashion with its emitter electrode connected to a phase shift circuit comprised of resistors R12 and R13 and capacitors C5 and C6. The in-phase carrier is taken from terminal **12*a* of the phase shift circuit, while the carrier which is 180° out-of-phase is taken from output terminal 12*b*** of the phase shift circuit.

The output waveform appearing at output terminal 22 of emitter follower stage 21 is impressed upon input terminal **24*b* of timing circuit 24. Timing circuit 24 receives the data at its input terminal 24*a* and the output from emitter follower 21 appearing at terminal 22 which is employed to step out data impressed upon timing circuit 24 at the clock pulse rate. The output of timing circuit 24 appears at its output terminal 24*c* and is impressed upon the input terminal 13 of keying circuit 15 which is employed to key the circuits 16 and 17 in a manner to be more fully described. The data waveform 14 is impressed upon the base electrode of a transistor Q11 which has its collector electrode connected to the base electrode of transistor Q12 which is connected in emitter follower fashion. The output is taken from the emitter electrode of transistor Q12 and appears at terminal 15*a* to provide the inverted waveform, as shown in FIGURE 1. Due to the fact that while transistor Q12 is connected in emitter follower fashion, the transistor Q11 inverts the input waveform at its base, thus providing the inverted waveform output at its terminal 15*a*. The collector electrode of transistor Q12 is further connected to the base electrode of transistor Q13 through resistor R47. The collector electrode of transistor Q13 is connected to the base electrode of a transistor Q14 connected in emitter follower fashion. Transistor Q13, which operates as a D-C amplifier, inverts the input waveform at its base electrode so as to provide the in-phase output waveform as shown adjacent the output terminal 15*b*** in FIGURE 1.

The output of the in-phase carrier appearing at the output terminal **12*a* of phase shift circuit 12 is impressed upon the base electrode of a transistor Q5 contained in the difference amplifier circuit 23. Transistor Q5 is connected in emitter follower fashion and has its emitter electrode connected to the base electrode of transistor Q6. The carrier signal which is 180° out-of-phase appears at the output terminal 12*b* of phase shift circuit 12 and is impressed upon the base electrode of transistor Q4 contained within difference amplifier 23. Transistor Q4 is also connected in emitter follower fashion and has its emitter electrode connected to the base electrode of transistor Q8. The emitter electrodes of transistors Q5 and Q7 are connected to the collector electrode of transistor Q6 through resistors R17 and R21 respectively, thus placing the collector of transistor Q6 in common with the emitter circuits of transistors Q5 and Q7. This arrangement provides an extremely accurate control on the current flow in the transistors Q5 and Q7, with transistor Q6 being biased by the voltage divider circuit comprised of resistors R18 and R19, which are connected at their common terminals to the base electrode of transistor Q6 to control the current flow through transistor Q6. The collector electrode of transistor Q6 is connected to the base electrode of transistor Q9 contained in the gate circuit 16, thus impressing the in-phase carrier upon gate circuit 16. The collector electrode of transistor Q8 is connected to the base electrode of transistor Q15 contained in the gate circuit 17, thus impressing the out-of-phase carrier upon gate 17**.

The operation of gate circuit 16 is as follows:

The in-phase carrier waveform is impressed upon the input terminal 16b of gate circuit 16 and is impressed through a capacitor C9 upon the base electrode of transistor Q9. Transistor Q9 is connected to operate in emitter follower fashion and produces the exact waveform impressed upon its base electrode at its emitter electrode. A transistor Q10 has its emitter electrode connected in common with the emitter electrode of transistor Q9 and goes to a +12 v. DC level through a common resistor R31. The input terminal 16c of gate circuit 16 receives the synchronized data waveform from output terminal 15a of keying circuit 15 and impresses this waveform upon the base electrode of transistor Q10. The operation is such that when the binary one state (−3 v. DC) appears at the base electrode of transistor Q10, this transistor being connected in emitter follower fashion, places its emitter electrode at the binary one level (−3 v. DC). This in turn places the emitter electrode of transistor Q9 at the −3 v. DC level. A voltage divider circuit comprised of resistors R28 and R29 having their common terminals connected to the base electrode of transistor Q9, have ohmic values causing the base electrode of transistor Q9 to be at the −6 volt level. When the emitter electrode is at the −3 volt level, this places the PNP transistor Q9 in the conductive state, causing the signal appearing at its base electrode (the in-phase carrier) to appear at its emitter electrode. Thus with the binary one state appearing at the base electrode of transistor Q10, gate circuit 16 passes the in-phase carrier.

When the binary zero level (−11 v. DC) is impressed upon the base electrode of transistor Q10, this places its emitter electrode at the −11 volt level. This −11 volt also appears at the emitter electrode of transistor Q9. The voltage divider circuit comprised of resistors R28 and R29 which make the voltage level at the base electrode of transistor Q9 −6 volts reverse biases the PNP transistor Q9, preventing it from conducting. Thus the in-phase carrier appearing at the base electrode of transistor Q9 is prevented from appearing at the emitter electrode of transistor Q9.

The gate circuit 17 operates in substantially the identical manner of gate 16, the only change being that the out-of-phase carrier is impressed upon the input terminal 17b of gate 17 while the inverted data waveform is impressed upon the input terminal 17c of gate circuit 17.

As was previously described, due to the fact that the data waveforms, as shown adjacent the output terminals 15a and 15b of FIGURE 1, are never in the same binary state at the same time, only one of the gate circuits 16 and 17 will pass the carrier at any given instant, while the other of the two gate circuits will block the carrier impressed upon its input terminal.

The output terminals 16a and 17a of gate circuits 16 and 17 respectively, are impressed upon the anode electrodes of respective diodes CR1 and CR2, which diodes have their cathode electrodes connected in common to one terminal of resistor R22, the opposite terminal of which is connected to the −12 v. DC bus 20. These diodes CR1 and CR2 comprise an OR gate which is designed to operate so that only the more positive signal appearing at the anodes of these diodes appear at the output terminal 18a of the OR gate 18. The resistor R22 is an adjustable resistor which is provided so as to regulate the signal level of the output signal appearing at terminal 18a. The outputs of gate circuits 16 and 17 are thereby added to form the phase modulated carrier 19 wherein the in-phase portons of the carrier represent a mark or binary one condition, while the out-of-phase portions represent the space or binary zero condition of the data waveform 14. While the schematic of FIGURES 1 and 2 are designed to operate so as to generate a phase modulated carrier of a frequency rate of 2500 c.p.s., it should be understood that the circuit may be designed to operate in any other suitable carrier frequency and the selection of the carrier frequency lends no novelty to the device of the instant invention.

The communications medium employed for transmitting the phase modulated carrier depends only upon the needs of the user and may be propogated through the atmosphere or by means of a wire line, such as, for example, a telephone link, connecting transmitter and the receiver facilities.

The receiver facility 30, shown in FIGURE 3 of the drawings, designed to receive the phase modulated carrier from the transmitter facility of FIGURES 1 and 2, is comprised of input transformer means 31 having its primary winding connected to the communications link, such as the telephone line, or the receiving antenna, for example, and has its secondary winding connected to an emitter follower circuit 32. The output of the emitter follower circuit 32 is impressed upon a phase splitting circuit 33 having first outputs 33a and 33b which emit a waveform exactly in phase with the waveform impressed upon its input terminal 33d and which emits a signal waveform at its output terminal 33c which is inverted 180° from the input waveform impressed upon its input terminal 33d. These outputs are passed through emitter follower circuits 34 and 35 respectively, to the input terminals 36a and 37a respectively, of phase comparison circuits 36 and 37. The other input terminals 36b and 37b of phase comparison circuits 36 and 37 receive the in-phase and inverted phase reference frequency waveforms and are employed as standards for determining the phase of the incoming phase modulated carrier at any given instant. The phase comparison circuits 36 and 37 are designed so as to generate an output thereof when the phase modulated carrier appearing at their first input terminals are in phase synchronism with the unmodulated carrier impressed at their second input terminal. Since, as previously described, the phase modulated carrier is at only one phase in any given instant, only one of the phase comparison circuits 36 and 37 will generate an output signal at any given instant. These output signals are impressed upon the respective input terminals 38a and 38b of amplitude interlock means 38. The output signals from the terminals 38a and 38b are combined with one another in first and second circuits which are to be more fully described in order to form square pulses at the output terminals 38c and 38d of amplitude interlock means 38, which signals are employed for the purpose of operating the flip-flop circuit 40 which is employed as a demodulation means. The combinng of these signals received at the input terminals 38a and 38b in the first and second circuits (not shown) of the amplitude interlock means 38 is performed in such a manner that when a square pulse is present at either of the two output terminals 38c and 38d, the remaining output terminal forms no square pulse at this time. These outputs from terminals 38c and 38d identify the marks and spaces of the incoming data so as to operate the demodulator flip-flop 40. By mixing the signals received at terminals 38a and 38b, in a manner to be more fully described, this provides a novel circuit which is dependent upon the form of both signals received at the input terminals of the amplitude interlocks 38 in order to identify the mark and space information. The outputs 38c and 38d of interlock circuit 38 are impressed upon D-C amplifiers 39 and 39′ respectively, the outputs of which are connected to the set and reset input terminals of a flip-flop circuit 40. The output is taken from terminal 40c of flip-flop 40 and the output waveform 41 generated by flip-flop circuit 40 at its output terminal 40c is an exact replica of the data waveform 14 of FIGURES 1 and 2.

In order to generate the carrier standard to ascertain the phase modulation of the incoming modulated carrier, the incoming carrier appears at the output terminal 33c of phase splitter 33. This is impressed upon the input of a full wave rectifier-amplification circuit 42, which amplifies and rectifies the incoming phase modulated carrier. The full wave rectification operation effectively generates a rectified output signal which is substantially twice the frequency of the incoming modulated carrier. In the present example, since the modulated carrier is 2500 c.p.s., the full wave rectified output is effectively 5000 c.p.s. The output of the full wave rectifier amplifier circuit 42 is employed to trigger a class C amplifier 43 which is tuned to operate at exactly 5000 c.p.s. and acts to convert the input pulses having a reptition rate of 5 kc. into a 5 kc. sine wave. The output of the class C amplifier 43 is impressed upon A-C amplifier 44 which is employed to trigger the input terminal 45*a* of a flip-flop circuit 45. The output of flip-flop circuit 45 is taken at its terminal 45*b*. The output signal is substantially a square pulse output half the frequency of the class C amplifier output, or 2500 c.p.s. The output at 45*b* is passed through an emitter follower 46 to the input terminal 47*a* of a monostable multivibrator 47. Multivibrator 47 which is also known as a one-shot multivibrator generates a narrow square pulse at its output terminal 47*b*, having a predetermined pulse width each time a positive going square pulse is impressed upon its trigger input terminal 47*a*. The repetition rate of the narrow square pulses generated by the one-shot multivibrator 47 is impressed upon a second class C amplifier 48 which is tuned to operate at 2500 kc. The class C amplifier 48 acts to generate a 2500 kc. sine wave output triggered by the pulses generated by one-shot multivibrator 47. The output of class C amplifier 48 is impressed upon a phase splitting circuit 49. The output terminal 49*a* of phase splitting circuit 49 produces a 2500 kc. sine wave which is passed through an emitter follower 50 to the output terminal X. This sine wave output is identified by the letter R. A second output terminal 49*b* generates a 2500 kc. sine wave, which is 180° out-of-phase with the output sine wave generated at output terminal 49*a*. This signal is passed through an emitter follower 51 and is available at the output terminal Y. The output sine wave at output terminal Y is identified by the letter $\overline{R}$. The R sine wave is impressed upon the input terminal 36*b* of phase comparison circuit 36, while the output signal $\overline{R}$ is impressed upon the input terminal 37*b* of phase comparison circuit 37. When the phase modulated carrier signal appearing at input terminal 36*a* is in-phase with the carrier standard R, phase comparison circuit 36 generates an output signal which is impressed upon the amplitude interlock circuit 38. The interlock circuit 38 provides first and second output signals at its output terminals 38*c* and 38*d*, which in turn are impressed upon the D-C amplifier circuits 39 and 39′ respectively. The output of amplifier 39 is impressed upon the set input terminal 40*a* of a flip-flop 40 which generates a binary one output condition at its output terminal 40*c* upon the occurrence of a positive going signal at its set input terminal 40*a*. It should be noted that when the input signal at terminal 36*a* is in-phase with the frequency standard R, then the input signal in phase comparison means 36 present at the input terminal 37*a* of phase comparison circuit 37 will be out-of-phase with the frequency standard $\overline{R}$, thus failing to generate any output signal at its terminal 37*c*. The output terminal 37*c* impresses its signal upon the amplitude interlock circuit 38 which combines this signal with the signal from the output termnal 36*c* to form a constant square pulse at its output terminal 38*d*, which is impressed upon the D-C amplifier 39. The output of amplifier 39′ is impressed upon the reset input terminal 40*b* of flip-flop 40 and in the example just stated no positive-going signal will be impressed upon input terminal 40*b* due to the out-of-phase relationship between the signal appearing at terminal 37*a* and the frequency standard $\overline{R}$. In the case where an in-phase condition exists at phase comparison circuit 37, a positive going condition at the reset input terminal 40*b* of flip-flop 40 will cause the output terminal 40 C to go to the binary zero state. It should be noted that whenever an in-phase condition exists at one of the comparison circuits 36 or 37, then the remaining one of the two phase comparison circuits will yield an out-of-phase condition so that only one of these phase comparison circuits generate an output at any given instant. It should further be noted that in the case where phase comparison means 36 generates no output, this signal (which is really a no signal condition) is combined in the interlock means 38 with the output signal of phase comparison means 37, the resulting output being a no signal condition at the output termnal 38*c*. It can thus be seen that at this given instant the amplitude interlock means operates in such a manner as to produce a square pulse at the output terminal 38*d* and to produce no signal at the output terminal 38*c*. In the reverse case where the phase comparison means 37 generates no output signal and the phase comparison means 36 generates an output signal, then the amplitude interlock means generates a square pulse output at its output terminal 38*c* and no output at its output terminal 38*d*. Since the output terminal 38*c* is associated with the phase comparison means 36 and the output terminal 38*d* is associated with the phase comparison circuit 37, it might be considered that the interlock circuit 38 serves no function. However, it is significant to note that the first and second combining circuits to be more fully described with respect to FIGURES 4*a*–4*c*, serves to produce square pulses at its output terminals and also effectively acts to remove any noise signal from the output square pulses which it generates. For example, the only two states which may occur at the output terminals 38*c* and 38*d* of the amplitude interlock circuit 38 is either a square pulse or no pulse condition. Hence noise signals are completely removed and therefore do not appear in the signals generated at the interlock circuit's output terminals. In addition thereto, when a square pulse appears at one of the two output terminals 38*c* or 38*d*, the other output terminal does not generate a pulse so that only one of these two outputs may generate a square pulse at any given instant.

Referring now to FIGURES 4*a*–4*c* which show the phase shift receiving means 30 in greater detail, the emitter follower input level adjuster circuit 32 receives the phase modulated carrier signal at its input terminal 32*a*. This is impressed through a capacitor C1 to the base of transistor Q1. The output is taken from the emitter through an adjustable potentiometer means comprised of resistor R4 and adjustable arm 51. The output is taken through arm 51 and capacitor C2 so as to be impressed upon the base terminal of transistor Q2 which forms the phase shifting means 33. The output is taken from the emitter electrode of transistor Q2 to be impressed upon the delay circuit comprised of resistors R9–*a* and R9–*b* and capacitors C3 and C4. The in-phase output is taken from terminal 52 and is impressed upon the base electrode of transistor Q3. Q3, which is connected in emitter follower fashion, has its emitter electrode connected through capacitor C6 to the base electrode of transistor Q7. The phase delayed signal is taken from the terminal 53 of the delay circuit and impressed upon the base electrode of an emitter follower transistor Q4. The emitter of transistor Q4 is connected through capacitor C5 to the base electrode of transistor Q5. The emitter electrodes of transistors Q5 and Q7 are connected through resistors R17 and R21 respectively, to the collector electrode of transistor Q6. Transistor Q6 forms a variable common emitter resistance for transistors Q5 and Q7 and acts to lock-in the phase relationship between the outputs taken at the collectors of transistors Q5 and Q7. Thus the output at the collector electrode of transistor Q7 is in-phase with the phase modulated carrier impressed upon input terminal 32*a*, while the output at collector electrode of transistor Q5 is phase delayed by 180° relative to the phase modulated carrier signal at input terminal 32*a*. The in-phase output signal appearing at the collector electrode of transistor Q7 is impressed upon the base electrode of transistor Q8 which has its collector and emitter electrodes respectively, connected across the collector and base electrodes respectively, of a transistor Q9. This arrangement is employed in order to provide current amplification for the emitter follower connected transistor Q9. The signal is taken from the emitter electrode of transistor Q9 and appears at the output terminal 53′ which is thereby the in-phase signal relative to the phase modulated carrier input signal. This signal is employed for the first and second phase comparison operations, in a manner to be more fully described.

The 180° phase delayed signal appearing at the collector electrode of transistor Q5 is impressed upon the base electrode of transistor Q10 which has its collector and emitter electrodes respectively, connected respectively to the collector and base electrodes of transistor Q11 which is connected in emitter follower fashion. The signal is taken from the emitter electrode of transistor Q11 and impressed via a capacitor C7 upon the primary winding *54a* of a transformer 54. Secondary winding *54b* has its terminals connected to diodes CR1 and CR2 and its center top point *54c* connected to the anode terminals of CR1 and CR2 through capacitor C8 and resistor R29 so as to form a full wave rectifier circuit. The output terminal 55 of the full wave rectifier 42 is connected to the base electrode of transistor Q12 which has its collector and emitter electrodes connected respectively, to the collector and base electrodes of transistor 13 to provide current amplification in the same manner as previously described. The full wave rectified signal appears at the emitter electrode of transistor Q13 and is available at the terminal 56. Terminal 56 is in turn connected to the base electrode of transistor Q14 which has its collector and emitter electrodes connected respectively, to the collector and base electrodes of transistor Q15. Transistor Q15 which is connected in emitter follower fashion forms the first ringing circuit 43 and has its emitter electrode connected through capacitor C9 to the emitter electrode of transistor Q16. Parallel connected capacitor C12 and inductor L1 are connected to the collector electrode of transistor Q16, inductor L1 being directly connected and capacitor C12 being connected through series elements C11 and R34. These circuit elements are tuned to twice the carrier frequency or in the present embodiment 2500 k.c., such that the ringing circuit generates a 5000 cycle sine wave at terminal 57. The sine wave passes to the base electrode of transistor Q17 which is connected in emitter follower fashion with the signal being taken at the emitter electrode of transistor Q17 and connected through series elements C14 and R42 to the base electrode of transistor Q18. Transistor Q18 is one element of the clipper amplifier 44 which is designed to amplify the signal applied at its base electrode and present the output signal at its collector electrode to the base of transistor Q19, which is series connected to the collector of Q18 through resistor R46. The output signal appears at the collector electrode of transistor Q19 and the form of the signal is such that it is a clipped and amplified version of the 5000 k.c. sine wave generated by the ringing circuit 43. The collector electrode of transistor Q19 is directly connected to the base electrode of transistor Q20. The collector electrode of transistor Q20 is connected to the input terminal 57 of binary flip-flop 45. Binary flip-flop 45 is comprised of transistors Q21 and Q22 such that the collector electrode of transistor Q22 is connected through capacitor C17 to the base electrode of transistor Q21, while the collector transistor of Q21 is connected to the base electrode of transistor Q22 via the series connected capacitor C18. The output terminal *45b* of the flip-flop circuit 45 is connected to the base electrode of transistor Q23 which is connected in emitter follower fashion. The output of transistor Q23 is taken from its emitter electrode and appears at terminal 58 as shown in FIGURE *4a*. Terminal 58 is connected to the input terminal 59 shown in FIGURE *4b* of the one-shot multivibrator 47 which is shown in FIGURE *4b* of the drawings. Input terminal 59 connects the incoming signal through a capacitor C20 and diode CR7 to the base electrode of transistor Q24. The collector electrode of transistor Q24 is coupled to the base electrode of transistor Q25 through the parallel connected elements of resistor R72 and capacitor C22. The collector electrode of transistor Q25 is connected to the base electrode of transistor Q24 through the capacitance elements C21 thus providing the one-shot multivibrator operation. One-shot multivibrator 47 generates narrow pulses of a predetermined pulse width at its output terminal, which is the collector electrode of transistor Q25. This terminal is directly connected to the base electrode of transistor Q26 which is connected in emitter follower fashion. The signal appearing at the emitter electrode of transistor Q26 is available at terminal 61 for use as a synchronizing source in stepping received data bits into a shift register (not shown), for example. Collector terminal 60 of transistor Q25 is further directly connected to the base electrode of transistor Q27 which is also connected in emitter follower fashion and which has its emitter electrode connected through a capacitor C25 to the base electrode of transistor Q28 which is contained in the second ringing circuit 48. Inductor and capacitor elements L2 and C26 are selected so as to resonate at the carrier frequency, which in the present example is 2500 k.c. The ringing circuit 48 therefore generates a sine wave output at a frequency of 2500 k.c. The output of ringing circuit 48 appears at the collector of Q28 and is in turn impressed upon the base electrode of transistor Q29 which has its collector and emitter electrodes connected respectively to the collector and base electrodes of transistor Q30 which is contained in the second phase shifting circuit 49. The output of transistor Q30 is taken through an adjustable potentiometer means comprised of a resistive element R83 and a movable arm 62 which has its stationary end connected through a capacitor C27 to the base of transistor Q31. Transistor Q31 which is connected in emitter follower fashion has its emitter electrode connected to a phase delay circuit comprised of resistors R–88A and R–88B and capacitors C28 and C29. The signal appearing at terminal *62a* of the phase delay circuit is in-phase with the signal appearing at the base electrode of transistor Q31 while the signal appearing at terminal 63 of the phase delay circuit is 180° out-of-phase relative to the signal appearing at the base electrode of transistor Q31. Output terminal *62a* is connected to the base electrode of transistor Q32 which is connected in emitter follower fashion and has its emitter electrode connected to the base electrode of transistor Q36 through the series connected capacitor C31. Output terminal 63 is directly connected to the base electrode of transistor Q33 which is also connected in emitter follower fashion and has its emitter electrode connected through capacitor C30 to the base electrode of transistor Q34. The emitters of transistors Q34 and Q36 are connected in common through respective resistors R96 and R100 to the collector electrode of transistor Q35 which operates as a variable common emitter resistance for transistors Q34 and Q36. Output terminal 64 which is the collector electrode of transistor Q34 generates the in-phase reference carrier which appears at terminal 65 and is identified by the symbol R. Output terminal 66 which is the collector electrode of transistor Q36 generates the out-of-phase reference carrier which is identified by the $\overline{R}$ at terminal 67. The carrier reference R and $\overline{R}$ which are phase-displaced by 180°, are employed for the purpose of establishing the phase of the phase-modulated input carrier signal received from the transmitter facility. The phase relationships are accurately maintained by the circuitry comprised of transistors Q34–Q36 due to the unique arrangement of these transistors.

The output terminal 65 is connected to the input terminal 69 of transistor Q37 which is connected in emitter follower fashion and has its emitter electrode directly connected to the base of transistor Q42. Output terminal 67 is directly connected to the input terminal 68 which is the base of transistor Q38. Transistor Q38 is connected in emitter follower fashion and has its emitter electrode 70 connected to the base electrode 80 of transistor Q60 shown in FIGURE 4c and for a purpose to be more fully described. The input terminal 71, which is the base electrode of transistor Q39 is connected to the output terminal 53' of phase shifter 33 shown in FIGURE 4a of the drawings at which output terminal the original phase modulated carrier appears. Transistor Q39 is contained in the first phase detection means 36 and has its collector and emitter electrodes connected respectively to the collector and base electrodes of transistor Q40. Transistor Q40 is connected in emitter follower fashion and has its emitter electrode connected to one terminal of a transformer means T2 through series connected capacitor C32. The carrier frequency standard R appearing at output terminal 65 and which is impressed upon transistor Q37 appears at the emitter electrode of transistor Q37 which is directly connected to the base electrode of transistor Q42. Transistor Q42 has its collector and emitter electrodes connected respectively, to the collector and base electrodes of transistor Q41 which is connected in emitter follower fashion. The emitter electrode of transistor Q41 is connected to the remaining terminal of transformer T2 through series connected capacitor C35. The operation of phase detector 36 is such that when the reference carrier and the phase modulated carrier, which is the input signal to the receiver facility, are in phase synchronism, there will be no voltage drop developed across the primary winding of transformer T2 so that no voltage will be generated across the output winding of transformer T2. The output winding of transformer T2 has its opposite terminals connected to the anode electrodes of diodes CR10 and CR11, the cathode electrodes of which are connected in common at point 72. The common terminal 72 is connected to a terminal 72a through a series resistor R110. Terminal 72a represents a common terminal between resistors R111 and R112 which form a voltage divider between the −12 volt D-C level and the B− level. Thus the common terminal 72 will be at some voltage level between B− and −12 volts D-C, the level of which is determined by the resistive elements R111 and R112, during the time when the phase modulated carrier input signal and the carrier reference are in phase synchronism. Terminal 72 is connected to the base electrode of transistor Q43 which has its collector and emitter electrodes connected respectively, to the collector and base electrodes of transistor Q44. In this particular example, the voltage level at 72 is sufficient to permit conduction of both transistors Q43 and Q44 to provide a signal at the emitter electrode of emitter follower connected transistor Q44. This signal which appears at terminal 73 is further connected to terminal 81 which is the base of transistor Q66 shown in FIGURE 4c of the drawings, which connection is for a purpose to be more fully described. The emitter electrode of transistor Q44 is further directly connected to the base of transistor Q45 which is likewise connected in emitter follower fashion and has its emitter electrode directly connected to the base electrode of transistor Q46. Capacitor C36 is employed as a filter means.

The second phase detection circuit 37 has an input terminal 75 which is connected to the output terminal 53 of phase shifting means 33, shown in FIGURE 4a of the drawings, which signal is the undelayed phase modulated carrier input signal. This is impressed upon the base of transistor Q57 which has its collector and emitter electrodes connected respectively, to the collector and base electrodes of transistor Q58. Transistor Q58 is connected in emitter follower fashion and has its emitter electrode connected through a capacitor C42 to one terminal of the primary winding of transformer T3. A second input terminal 80 of phase detector 37 is connected to the output terminal 70 of emitter follower transistor Q38, which generates the phase delayed reference frequency $\overline{R}$ which phase delayed reference frequency is impressed upon the base of transistor Q60. Transistor Q60 has its collector and emitter electrodes respectively, connected to the collector and base electrodes of transistor Q59. The transistor Q59 is connected in emitter follower fashion and has its emitter electrode connected through capacitor C45 to the remaining terminal of the primary winding of transformer T3. The second phase detection means 37 operates in a similar manner to phase detection means 36 such that when the phase delayed carrier standard and the phase modulated carrier input signal are in phase synchronism, no signal is generated across the primary winding of transformer T3 so that no signal will be generated across its secondary or output winding. The secondary winding of transformer T3 is connected in a manner similar to that of the secondary winding of transformer T2 such that its opposite terminals are connected to the anode electrodes of diodes CR16 and CR17. These diodes have their cathode electrodes connected in common at terminal 76. The common terminal between the cathodes of CR16 and CR17 is connected in series through resistor R147 to a common terminal between resistors R148 and R149, which form a voltage divider. Thus, in the absence of any voltage developed across the secondary winding of transformer T3, terminal 76 is substantially at a voltage level intermediate B− and −12 volts D-C. This voltage level is transferred from terminal 76 through a direct connection to the base electrode of transistor Q61 which has its collector and emitter electrodes connected respectively to the collector and base electrodes of transistor Q62. Transistor Q62 is connected in emitter follower fashion and has its emitter electrode connected simultaneously to the base electrode of transistor Q63 and also to the output terminal 77 which in turn is connected to terminal 78 of the first phase detection means 36. The transistor Q63 is connected in emitter follower fashion and has its emitter electrode directly connected to the base electrode of transistor Q64. Capacitor 46 is employed as filter means in the same manner as capacitor C36 of FIGURE 4b.

The output voltage level developed by the full wave rectifying means connected to the secondary winding of transformer T2 and passing through the emitter follower transistor Q44 is impressed upon the input terminal 81 of transistor Q66 which has its collector and emitter electrodes connected respectively to the collector and base electrodes of transistor Q65. Transistor Q65 is connected in emitter follower fashion and has its emitter electrode connected through resistor R156 to the emitter electrode of transistor Q64. Thus, transistor Q63 receives the resultant output of the full wave rectifying means connected to transformer T3, while transistor Q65 receives the resultant output of the full wave rectifying means connected to the transformer T2. Assuming that the output of transformer T2 is approximately −6 volts D-C which occurs when phase synchronism is present, and that the output of transformer T3 lies between −6 volts D-C and B− which means that phase synchronism does not occur at that point, transistor Q63 provides a voltage between −6 volts D-C and B− which appears at the base electrode of transistor Q64. With the −6 volt D-C level appearing at the output terminal 73 of phase comparison means 36, this voltage level is impressed upon transistor Q66 causing transistors Q66 and Q65 to conduct, placing a −6 volt D-C level at the emitter electrode of transistor Q65. This level is impressed upon the emitter electrode of transistor Q64 making the base electrode of transistor Q64 more positive than its emitter electrode. Transistor Q64, being an NPN transistor, will therefore conduct to provide an output voltage at its terminal 79 at substantially less than +12 volts D-C, which level is in turn impressed upon the base electrode of transistor Q67. The emitter electrode of transistor Q67 is connected through series resistor element R162 to the base electrode of transistor Q68. Transistor Q67 being an NPN transistor, conducts, causing transistor Q68 which is also an NPN transistor to likewise conduct and will generate a signal having a voltage level intermediate B— and +12 volts D-C at its output terminal 82. Transistors Q67 and Q68 are provided to form a square pulse upon conduction of transistor Q64 in order to provide a suitable trigger for operating the flip-flop or demodulator circuit 40. Thus, even though transistor Q64, while conducting, may not be driven into complete saturation, transistors Q67 and Q68 are driven into complete saturation in order to provide an extremely good square pulse for the triggering operation. Output terminal 82 is connected to input terminal 83 (see FIGURE 4*c*) which is the base electrode of transistor Q56. Transistor Q56 being an NPN transistor, will conduct, disconnecting a voltage of greater than the B— voltage level upon the input terminal 84 of the demodulator or flip-flop circuit 40. The flip-flop circuit 40 is comprised of transistors Q52 and Q53 which are connected in such a manner that the collector electrode of transistor Q52 is connected to the base electrode of transistor Q53 through the parallel connected elements R137 and C39. The collector electrode of transistor Q53 is connected to the base electrode of transistor Q52 through the parallel connected elements C38 and R132, thus establishing the binary flip-flop operation. The input terminal 84 is connected to the base electrode of transistor Q53 through the parallel connected diodes CR15 and CR15*a*, as well as the capacitor C40. A positive voltage level at this point (i.e., with a voltage level greater than B—), prevents the transistor Q53, which is a PNP transistor, from conducting, thus causing transistor Q53 to be cut-off and hence causing transistor Q52 to conduct. This places the collector electrode of transistor Q53 substantially at the —12 volt level which is impressed upon the base electrode of transistor Q54 which is connected in emitter follower fashion. Thus, a voltage level of substantially —12 volts appears at the output terminal 85 of transistor Q54.

Phase detection means 36 operates in a similar manner such that the full wave rectified output taken from the output winding of transformer T2 is impressed through transistors Q43 and Q44 to the base electrode of transistor Q45, while the full wave rectified output taken from the secondary winding of transformer T3 is passed through transistors Q61, Q62, Q48 and Q47. The emitter electrode of Q47 is connected through resistor R120 to the emitter electrode of transistor Q46, while the emitter electrode of transistor Q45 is directly connected to the base electrode of transistor Q46 and further to the emitter electrode of transistor Q46 via the capacitor C36. Thus, while in the case of the transistor Q64 having the output of transformer T3 applied to its base electrode, the transistor Q46 has the output of transformer T3 applied to its emitter electrode and while transistor Q64 has the output of transformer T2 connected to its emitter electrode, transistor Q46 has the output of transformer T2 connected to its base electrode. Thus, there is a complete reversal of connections between transistors Q46 and Q64 such that only one of these transistors can be conducting at any given instance. Thus, transistor Q46 operates in a manner identical to that of transistor Q64 with the reverse result being obtained. The output of transistor Q46 is connected through its collector to the base electrode of transistor Q49, which has its emitter electrode connected via resistor R125 to the base of transistor Q50. The collector electrode of transistor Q50 has its output signal appearing at terminal 86 which in turn is connected to terminal 87 which is the base electrode of transistor Q51. A similarity between the circuits can be seen where the output of transistor Q64 is connected to the base electrode of transistor Q67. The output of transistor Q46 is shown connected in an identical manner to a similar transistor Q49 and further where the output of transistor Q67 is connected to transistor Q68 so the transistor Q49 is connected in a like manner to transistor Q50 which is substantially identical to transistor Q68. In addition thereto, it will be noted that transistor Q50 which has its collector electrode connected to the base electrode of transistor Q51 is substantially identical to transistor Q68 which has its collector electrode connected to the base electrode of transistor Q56. Transistors Q51 and Q56 are substantially similar in their functions in that the emitter electrode of transistor Q56 is connected via rectifiers CR15 and CR15*a* to the base electrode of transistor Q53, while the emitter electrode of transistor Q51 is connected via the diodes CR14 and CR14*a* to the base electrode of transistor Q52. Thus, one of the transistors Q46 and Q64 will always present a positive voltage level to the set and reset inputs of the flip-flop or demodulator circuit 40, while the other of these transistors will present a B— level to the remaining input terminal acting to set or reset flip-flop 40 in accordance with the phase of the phase modulated carrier signal input at any given instant. The output of the flip-flop circuit is taken from the collector electrode of transistor Q53 and is impressed upon the base of emitter follower connected transistor Q54 and appears at the output terminal 85. With the flip-flop in its reverse state, the output is taken from the collector electrode of transistor Q52 which impresses its voltage level upon the base electrode of transistor Q55, which is connected in emitter follower fashion to present its output voltage level at the terminal 86. The result is therefore a waveform as shown by the numeral 41 of square pulses identifying a mark or binary one condition and the absence of a square pulse to identify a space or binary zero condition.

It will therefore be seen that the instant invention provides a novel phase shift transmission communications system which automatically synchronizes the receiver facility with the transmitter facility by generating carrier frequency standards through use of the phase modulated carrier, and without the need for additional synchronizing pulses to be added to the transmitted carrier. The novel interlock circuits provided herein acts to provide the output signals needed to successfully operate the demodulator means 40. The novel amplitude interlock circuit 38 depends for its operation upon the outputs of both phase comparison means 36 and 37 and employs two combining circuits comprised of the transistors Q46 and Q64, respectively, so as to be dependent upon the outputs of both phase comparison circuits simultaneously to obtain the necessary triggering voltages for operating demodulator 40 to obtain the binary data employed to modulate the carrier frequency.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Communication means comprising first means for receiving phase modulated carrier signals; second means connected to said first means having two outputs; said second means including means for producing said phase modulated carrier signals at said first output, and means for producing said phase modulated signals with a 180 degree phase delay at said second output; third means connected to said second output for generating first and second carrier frequency standards phase displaced from one another 180 degrees; first phase comparison means for comparing said first output signal with said first carrier frequency standard to generate a signal only when said first carrier frequency and first output signal are in phase; second comparison means for comparing said first output signal with said second carrier frequency standard to generate a signal only when said second carrier frequency and said first output signal are in phase; demodulator means connected to said first and second phase comparison means and controlled only by the comparison means generating a signal to indicate an in phase condition for generating a demodulated output signal indicative of the phase modulation state of said carrier signals received by said first means comprising amplitude interlock means coupled to the outputs of said first and second phase comparison means for comparing the relative amplitude of the signals output therefrom, and means coupled to the output of said amplitude interlock means for generating output signals representing the information received in said phase modulated carrier signal.

2. The device of claim 1 in which said means in said second means for providing a signal at said first output includes a first phase shifting circuit and at least a first transistor coupled thereto for providing the signals at said first output, and said means in said second means for providing the signals at said second output comprising a second phase shifting circuit and a second transistor coupled thereto, means connecting the emitter of said first and second transistor in common, and constant circuit generating means coupled to said common emitter circuit.

3. The device of claim 1 wherein said amplitude interlock means is comprised of first and second amplitude interlock circuits each having first and second inputs to receive outputs of said first and second phase detector means respectively, and each having an output terminal;

dual input flip-flop means having the outputs of said first and second interlock circuits each coupled to a respective one of its input terminals for triggering only one of its input terminals at any given instant to set the flip-flop means to the state indicative of the phase modulation of the received carrier at any given instant.

4. The device of claim 3 wherein each of said first and second interlock circuits is comprised of a transistor having base, emitter and collector electrodes and developing an output at its collector electrode; the output of said phase comparison means being simultaneously connected to the base electrode of said first interlock circuit and the emitter electrode of the second interlock circuit; the second phase comparison means having its output simultaneously connected to the emitter electrode of said first interlock circuit and the base electrode of said second interlock circuit.

5. Communication means comprising first means for receiving phase modulated carrier signals; second means connected to said first means having two outputs; said second means including means for producing said phase modulated carrier signals at said first output terminal and means for producing said phase modulated signals with a predetermined phase delay at said second output; third means connected to said second output for generating first and second carrier frequency standards phase displaced 180 degrees from one another; first phase comparison means for comparing said first output signal with said first carrier frequency standard; second comparison means for comparing said first output signal with said second carrier frequency standard; demodulator means connected to said first and second phase comparison means for generating a demodulated output signal indicative of the phase modulation of said carrier signals received by said first means; said third means comprising fourth means for performing full wave rectification on said second output signal; fifth means triggered by said fourth means for generating a first sinusoidal output signal of twice the frequency of said first output signal; sixth means for dividing said first sinusoidal output signal; and seventh means for generating said first and second carrier frequency standards; said seventh means comprising delay means for phase delaying said divided sinusoidal output signal; said sixth means comprising eighth means for clipping said first sinusoidal output signal; ninth means for dividing said clipped first sinusoidal output signal by two; tenth means triggered by said divided output signal for generating a second sinusoidal output signal of the same frequency as said phase modulated carrier signals received by said first means.

6. Communication means comprising first means for receiving phase modulated carrier signals; second means connected to said first means having two outputs; said second means including means for producing said phase modulated carrier signals at said first output terminal and means for producing said phase modulated signals with a predetermined phase delay at said second output; third means connected to said second output for generating first and second carrier frequency standards phase displaced 180 degrees from one another; first phase comparison means for comparing said first output signal with said first carrier frequency standard; second comparison means for comparing said first output signal with said second carrier frequency standard; demodulator means connected to said first and second phase comparison means for generating a demodulated output signal indicative of the phase modulation of said carrier signals received by said first means; said third means comprising fourth means for performing full wave rectification on said second output signal; fifth means triggered by said fourth means for generating a first sinusoidal output signal of twice the frequency of said first output signal; sixth means for dividing said first sinusoidal output signal; and seventh means for generating said first and second carrier frequency standards; said seventh means comprising delay means for phase delaying said divided sinusoidal output signal; said sixth means comprising eighth means for clipping said first sinusoidal output signal; ninth means for dividing said clipped first sinusoidal output signal by two; tenth means triggered by said divided output signal for generating a second sinusoidal output signal of the same frequency as said phase modulated carrier signals received by said first means; said ninth means comprising a flip-flop circuit connected to said eighth means and a one-shot multivibrator circuit connected to said flip-flop circuit.

References Cited

UNITED STATES PATENTS

| | | | |
|---|---|---|---|
| 3,112,448 | 11/1963 | McFarlane | 325—320 |
| 3,181,122 | 4/1965 | Brown | 325—320 |
| 3,238,459 | 3/1966 | Landee | 325—320 |
| 2,652,451 | 9/1953 | Feten | 178—88 |
| 3,112,448 | 11/1963 | McFarlane et al. | 325—30 X |
| 3,242,262 | 3/1966 | Melas et al. | 178—66 |
| 3,088,069 | 4/1963 | Markey | 325—49 |

ROBERT L. GRIFFIN, *Primary Examiner.*

DAVID G. REDINBAUGH, JOHN W. CALDWELL, *Examiners.*

S. J. GLASSMAN, W. S. FROMMER, *Assistant Examiners.*